United States Patent
Larson et al.

(10) Patent No.: US 9,354,316 B2
(45) Date of Patent: May 31, 2016

(54) POLARIZED TRACKER SYSTEM AND METHOD FOR TRACKING MOVEMENT

(71) Applicant: HONEYWELL INTERNATIONAL INC., Morristown, NJ (US)

(72) Inventors: Brent D. Larson, Phoenix, AZ (US); Ken Leiphon, Phoenix, AZ (US); Greg Reinhart, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 114 days.

(21) Appl. No.: 14/184,317

(22) Filed: Feb. 19, 2014

(65) Prior Publication Data
US 2015/0234050 A1  Aug. 20, 2015

(51) Int. Cl.
*G01J 4/00* (2006.01)
*G01S 17/66* (2006.01)
*G01S 7/481* (2006.01)
*G02B 27/01* (2006.01)
*G02B 27/00* (2006.01)

(52) U.S. Cl.
CPC .............. *G01S 17/66* (2013.01); *G01S 7/4813* (2013.01); *G02B 27/0093* (2013.01); *G02B 27/0101* (2013.01); *G02B 27/017* (2013.01); *G02B 27/0149* (2013.01); *G02B 2027/014* (2013.01); *G02B 2027/015* (2013.01)

(58) Field of Classification Search
CPC .................................................. G01J 4/00
USPC ..................................... 356/27, 28, 364, 369
See application file for complete search history.

(56) References Cited

U.S. PATENT DOCUMENTS

| | | | | | |
|---|---|---|---|---|---|
| 2,503,023 | A | * | 4/1950 | Berry | 250/232 |
| 3,306,159 | A | * | 2/1967 | Beall, Jr. et al. | 250/225 |
| 3,604,811 | A | * | 9/1971 | McMenmin | 250/231.13 |
| 3,804,522 | A | * | 4/1974 | Smith | 356/369 |
| 3,877,816 | A | | 4/1975 | Weiss et al. | |
| 3,932,039 | A | * | 1/1976 | Frey | 356/138 |
| 4,863,274 | A | * | 9/1989 | Spillman et al. | 356/364 |
| 4,874,245 | A | * | 10/1989 | Spillman et al. | 356/364 |
| 5,424,535 | A | * | 6/1995 | Albion et al. | 250/225 |
| 5,815,269 | A | * | 9/1998 | Crabb et al. | 356/364 |

(Continued)

FOREIGN PATENT DOCUMENTS

| | | |
|---|---|---|
| CN | 102457732 A | 5/2012 |
| WO | 9920173 A1 | 4/1999 |
| WO | 2004019459 A2 | 3/2004 |

OTHER PUBLICATIONS

Boher, P., et al.; Polarized based stereoscopic 3D display characterization using Fourier optics instrument and computation in the observer space; ELDIM, 1185 rue d'Epron, 14200 Herouville St Clair, France.

(Continued)

*Primary Examiner* — Roy M Punnoose
(74) *Attorney, Agent, or Firm* — Ingrassia Fisher & Lorenz, P.C.

(57) ABSTRACT

A system and method are provided for leveraging emitted polarized electromagnetic radiation as a means to track relative orientation and position of an object with regard to another object. Six basic degrees of freedom including three angular and three translational are determined based on making multiple polarization-based measurements and then determining the corresponding geometry that would yield those measurements.

28 Claims, 4 Drawing Sheets

(56) References Cited

U.S. PATENT DOCUMENTS

| | | |
|---|---|---|
| 5,844,674 A | 12/1998 | Sieben |
| 7,190,518 B1 | 3/2007 | Kleinberger et al. |
| 7,633,521 B2 * | 12/2009 | Perlman et al. ............... 348/154 |
| 8,289,178 B2 * | 10/2012 | Slemon ............... G08B 17/107 250/216 |
| 2010/0109975 A1 | 5/2010 | Larson |
| 2010/0118305 A1 * | 5/2010 | Siraky et al. ............... 356/368 |

OTHER PUBLICATIONS

EP Extended Search Report for Application No. EP 15153704.4, Dated Jul. 16, 2015.

* cited by examiner

POLARIZED TRACKER SYSTEM AND METHOD FOR TRACKING MOVEMENT

TECHNICAL FIELD

The exemplary embodiments described herein generally relate to movement tracking systems and more particularly to tracking movement of an object in relation to a platform.

BACKGROUND

There are many instances where it is desired to know a movement of an object in relation to another object. Known tracker technologies include inertial, magnetic, ultrasonic, and camera-based optical systems. These approaches, however, have been developed primarily for head worn displays (HWD), for example, military helmets, and tend to be expensive, overly bulky, and can have latency issues.

One known use of movement tracker technology involves the aviation industry. As the operation of vehicles such as airplanes becomes more complex, it is preferable that the vehicle operator, e.g., the flight crew, be attentive and receives information in a timely manner to ensure proper operation. One method for providing information is a near-to-eye (NTE) display system. Head-tracker technology is a key aspect of a head-worn, or a NTE display, system, especially when it is desired to provide the functionality of a conformal head-up-display (HUD) in a compact NTE form factor. A NTE display system is a type of HWD system which uses, e.g., glasses, a visor, a helmet, or a cap to place a display in front of one or both eyes. Typically, the NTE display is semi-transparent, including, for example, an optical combiner element with collimating optics and a microdisplay (such as a liquid crystal display (LCD), liquid crystal on silicon (LCoS) display, or organic light emitting diode (OLED) display) so the information presented to the user on the NTE display can be superimposed on the visible scene. For example, a NTE display can provide a representative view of a scene outside the vehicle for use by the vehicle's operator even in poor visibility conditions, such as thick fog conditions Accordingly, it is desirable to provide a system and method for tracking movement of an object which allows for a simple, small, and light weight tracking assembly. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for tracking movement of an object in relation to a platform.

In an exemplary embodiment, a method for tracking movement of an object in relation to a platform, comprises transmitting polarized electromagnetic radiation from a plurality of emitters, the emitters affixed to one of the object and the platform, the object configured to be pointed in at least one of a plurality of directions relative to the platform; receiving the polarized electromagnetic radiation by a plurality of polarized detectors affixed to the other of the object and the platform; measuring polarized electromagnetic radiation levels of the polarized electromagnetic radiation received by the plurality of polarized detectors; and analyzing the received polarized electromagnetic radiation levels to determine the at least one direction the object is pointed relative to the platform In another exemplary embodiment, a movement tracking system comprises a first object; a second object; a plurality of emitters affixed to one of the first object and the second object; a plurality of detectors affixed to the other of the first object and the second object; and a processor coupled to the emitters and the detectors and configured to instruct the emitters to transmit polarized electromagnetic radiation; receive data from the detectors indicative of polarized electromagnetic radiation received by the detectors; and analyze the data to determine at least one direction the first object is pointed relative to the second object.

BRIEF DESCRIPTION OF THE DRAWINGS

The present invention will hereinafter be described in conjunction with the following drawing figures, wherein like numerals denote like elements.

DETAILED DESCRIPTION

Figure 1:
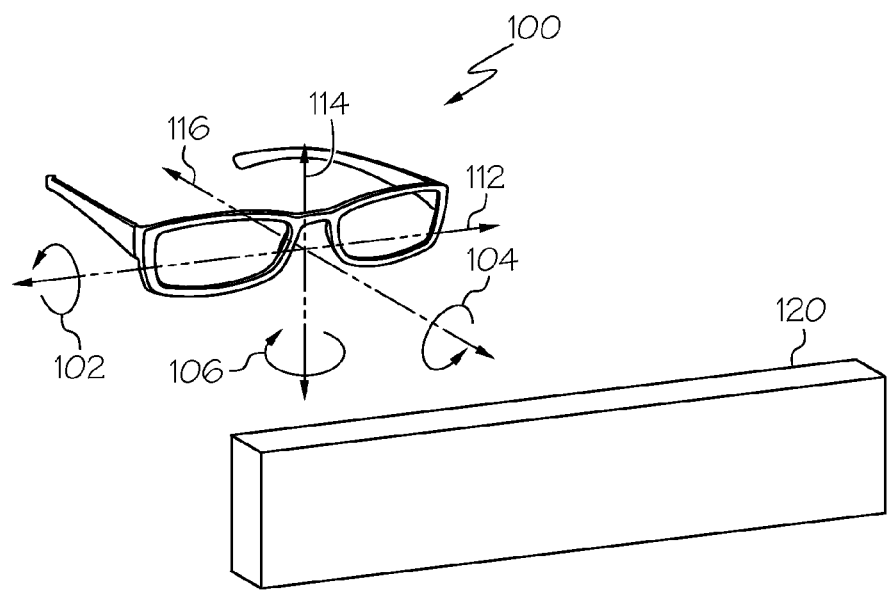
FIG. 1 is a head worn system for displaying information in accordance with the exemplary embodiments described herein.

The following detailed description is merely illustrative in nature and is not intended to limit the embodiments of the subject matter or the application and uses of such embodiments. Any implementation described herein as exemplary is not necessarily to be construed as preferred or advantageous over other implementations unless so stated. Furthermore, there is no intention to be bound by any expressed or implied theory presented in the preceding technical field, background, brief summary, or the following detailed description.

It should also be noted that FIGS. 1-6 are merely illustrative and may not be drawn to scale. Additionally, a Cartesian coordinate system including x, y, and z axes and/or directions, is shown to clarify the relative position and/or orientation of the components, according to the various embodiments. However, this coordinate system is only intended to assist in the explanation of various aspects of the present invention, and should be not construed as limiting.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Any of the above devices are exemplary, non-limiting examples of a computer readable storage medium.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The exemplary embodiments described herein leverage polarization to track the orientation and position of a first object relative to a second object, for an example, an object with regard to a platform. This approach provides high accuracy, very low latency (for example, sub-millisecond), reduced form factor, simplified installation, tolerance of metallic structures, and reduced cost. Exemplary embodiments include providing feedback of movement to a movement actuator, displaying information including symbols and graphics such as conformal images on a near-to-eye display worn by a pilot and based on movement of the pilot's head, display systems such as displays in sea going vessels, and displays used by off-site controllers, e.g., ground controllers, based on movement of the user's head, or possibly a remote pilot's head. Many other display applications can also benefit from tracking capabilities.

One exemplary embodiment uses three polarized electromagnetic radiation sources and three matching polarized detectors. As used herein, electromagnetic radiation includes emitted electromagnetic radiation having a compatible wavelength (for example, significantly smaller than the distances between emitters and detectors) and includes the spectrums of, for example, visible light, ultraviolet, near infrared, and infrared. Each matched pairing could allow measurement of one of three independent angles of differential rotation. The set of three angles could be the classic Euler angles or, for example, in an aviation environment, equivalent angular descriptions such as the more familiar set of pitch, roll, and yaw relative to a frame of reference such as a flight deck.

When the natural scenario of compound angles and translations is included, the geometry and inherent interactions between the relative angles and positions become more complex. The underlying capability remains, however, to determine all six basic degrees of freedom (DOF) including three angular and three translational degrees based on making multiple polarization-based measurements and then determining the corresponding geometry that would yield those measurements.

See, for example the glasses 100, or HWD, of FIG. 1 that includes a first angular axis 102 (pitch), a second angular axis 104 (roll), and a third angular axis 106 (yaw). Additional translational movement may be considered, for example, a first translational direction 112 (X), a second translational direction 114 (Y), and a third translational direction 116 (Z). By suitable mounting of emitters and detectors, the orientation or position (or both) of the head and/or the HWD such as a NTE display system could be determined with regard to another object 120, such as a platform.

The method for calculating the angles and positions from the measured data could take several forms. One example would be to condense measurements into six independent metrics and apply a suitable transformation (e.g., a matrix if linearly related, such as could be the case if manipulating direction cosines) that converts those condensed metrics into the desired DOF metrics. Another exemplary method would be to calculate a numerical fit of an oversampled system, and use the oversampling to average out (filter) any potential noise in the sampled data, provide redundancy (e.g., if one or more emitters get blocked or encounters anomalous signal levels due to spurious reflections or other situations), or enhance sensitivity in certain geometric relationships (e.g., spatial vs. angular sensitivities). Additional signal processing methods may also be used to improve the extracted DOF metrics, for example by including temporal characteristics of the measurements (for example, measured levels). Methods such as Kalman filtering and related techniques are well-known to those skilled in the art.

The calculation of the spatial coordinates of the object, such as the eyewear 100, may include a determination of the at least one degree of freedom of the object to which the emitters are affixed relative to the platform to which the detectors are affixed. Knowing the spatial coordinates may be useful for controlling the operation of the tracked object, such as determining the information to be displayed in the exemplary embodiment of a NTE display associated with the glasses.

Figure 2:
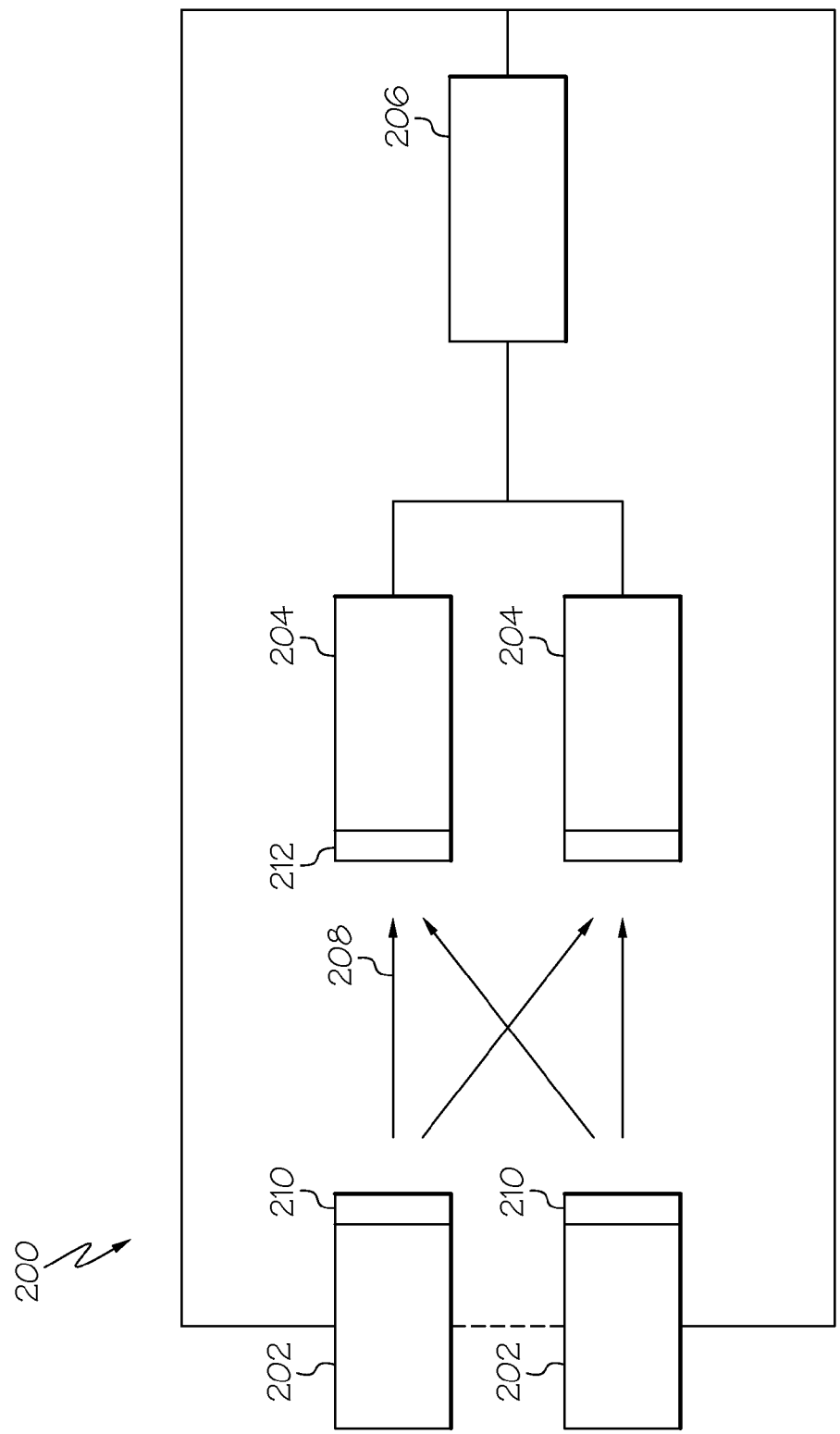
FIG. 2 is a block diagram of a display system suitable for use in an aircraft in accordance with the exemplary embodiments described herein.

Several methods or configurations could be used to adapt the hardware implementation of a HWD to specific goals or needs. Exemplary considerations could include:
  Head-worn size, form factor, and/or weight
  Nature of the head-worn components (e.g. emitting, detecting, or even potentially passive such as reflectors with polarizers and/or birefringent films)
  Functional range of angles and/or positions to be tracked
  Operating speed or latency
  Required accuracy or noise immunity
  Ambient environment, including ambient lighting conditions
  Positioning and/or number of remote (not head-worn) modules
  Low cost
  Low power
  Redundancy It should be understood that FIG. 2 is a simplified representation of a polarized tracking system 200 for purposes of explanation and ease of description, and FIG. 2 is not intended to limit the application or scope of the subject matter in any way. In practice, the polarized tracking system 200 may include numerous other devices and components for providing additional functions and features, as will be appreciated by those skilled in the art.

FIG. 2 includes a plurality of emitters 202, a plurality of detectors 204, and a processor 206. A plurality of polarizers (polarizing filters) 210 are positioned over or otherwise combined with the plurality of emitters 202, one polarizer 210 per emitter for polarizing the electromagnetic radiation 208 which is detected by the detectors 204. A plurality of polarizers 212 are positioned over or otherwise combined with the plurality of detectors 204, one polarizer 212 per detector. The processor instructs the polarized emitters 202 when to provide pulses of polarized electromagnetic radiation 208 and provides an analysis of the polarized electromagnetic radiation levels output from the polarized detectors 204. As used herein, analysis includes performing a calculational analysis of the measured "polarized electromagnetic radiation levels" or signals.

The emitters 202 and detectors 204 may comprise any known or subsequently developed emitters and detectors that emit and detect, respectively, electromagnetic radiation. For example, polarization-insensitive emitters and polarizers may be used in combination with polarizing filters, as shown in FIG. 2. Alternately, the corresponding polarizers 210 and/or 212 may be omitted if the emitter outputs are inherently polarized and/or the detectors are inherently polarization sensitive. Further exemplary embodiments may include additional unpolarized emitters and/or detectors. These would provide additional measurement data which could be used, for example, to normalize other measurements for effects such as distance rolloff or projected area factors. Still further variations are also possible, such as the inclusion of birefringent retardation films with the polarized emitters and/or detectors. While the most familiar types of polarizers are uniaxial absorbing polarizer elements, this is not intended to be limiting and other types of polarizing elements (e.g., reflective, dielectric, and beam splitting polarizers, or combinations of cholesteric polarizers with appropriate quarter-wave retardation films) can be used.

The processor 206 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

During the course of this description, like numbers may be used to identify like elements according to the different figures that illustrate the various exemplary embodiments.

Figure 3:
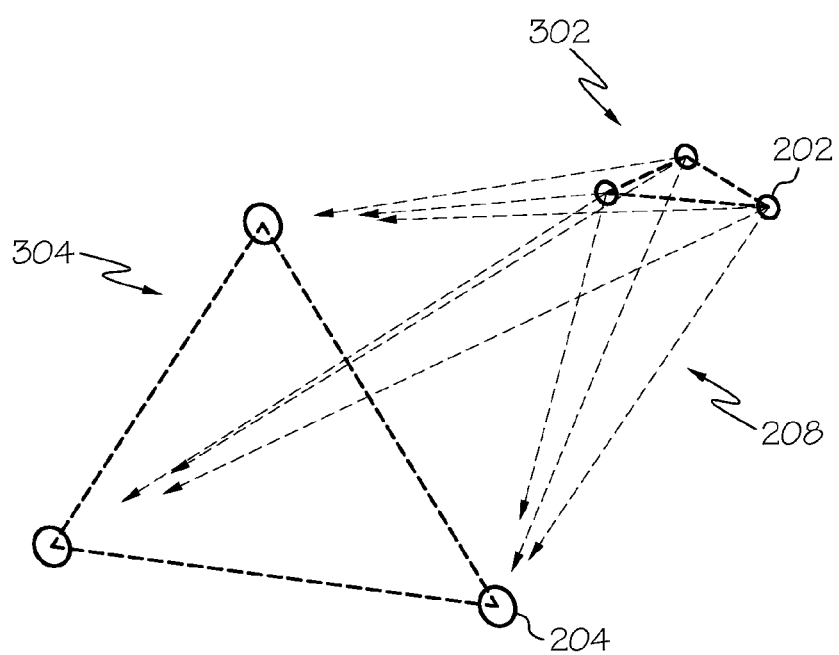
FIG. 3 is a schematic of three emitters for emitting polarized electromagnetic radiation and three detectors for receiving the polarized electromagnetic radiation in accordance with an exemplary embodiment.

Referring to the exemplary embodiment shown in FIG. 3, a plurality of emitters 202 in the form of a triangle 302, for example, three near-infrared (NIR) LEDs, may be independently pulsed. Each emitter 202 would have a uniaxial absorbing polarizer 210 (FIG. 2) adjacent the emitter such that it is between the emitter 202 and a detector 204 in the form of a triangle 304, with the absorbing axes for the separate polarizers 210 being distributed in orientation, preferably in three dimensions. The plurality of detectors 204 would each have an associated uniaxial absorbing polarizer 212 (FIG. 2), and would measure the result signals from the emitters, with the measured signal levels varying with the angle of polarization from each source as well as possibly other geometric parameters. With three polarized detectors 204 and three polarized emitters 202, there would be up to nine possible independent measurements (emitter/detector pairs), conceptually more than enough to deduce six independent DOF. By optimizing the three-dimensional relationships of the emitters 202 and detectors 204, it should be possible to better match the desired ranges and/or sensitivities for the target application. FIG. 3 is an example configuration, with the triangle 302 representing emitters 202 affixed to the eyewear 100 or other structure. The larger triangle 304 represents a set of detectors 204, at least some of which are polarized, affixed to a structure, platform 120, or other object. It should be understood that the detectors 204 may be affixed to the eyewear 100 and the emitters 202 affixed to another object 120, or emitters 202 and detectors 204 may be affixed to both the eyewear 100 and the platform 120. Increasing the number of emitters 202 or detectors 204 would increase the available data from which to extract the relationship being measured. Un-polarized emitters 202 and detectors 204 may also be included as described above, and the relative positions of emitters 202 and detectors 204 may be adjusted to best utilize the available space. Broadening the spatial spread of elements, for example to the sides, rear, and above the object to be tracked may improve the tracking capability, while at the same time there may be emitter-detector pairings that do not always have a clear line of sight between them.

The method and system described above may be utilized in any scenario in which an object moves with respect to another object or platform, including vehicles such as aircraft, land vehicles, and watercraft. Although the embodiment shown in the drawings incorporates a headset, it should be understood that the methods and system described herein may also be used on other head-worn headset devices, such as helmets, goggles, or ear-supported devices. Other embodiments are possible in which the NTE display is not present, but other components are movably coupled and jointly tracked using the above-described methods. The method and system may also be used with unmanned vehicles, in which an operational range limit of the headset corresponds to a station where a user remotely controls the vehicle.

Figure 4:
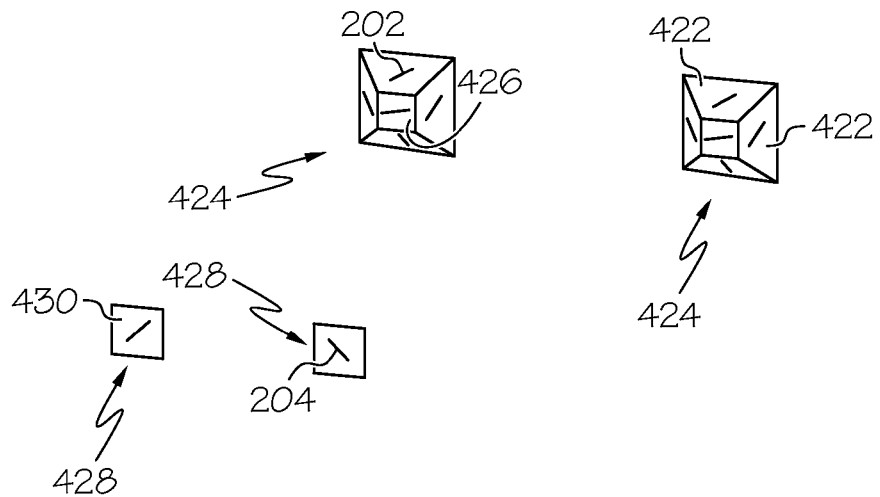
FIG. 4 is a schematic of two polarized detectors and two multi-axis polarized emitter assemblies in accordance with another exemplary embodiment.

In another exemplary embodiment (FIG. 4), polarized emitters 202 are positioned on the sides 422, 426 of a truncated square-based pyramid 424, thereby having four angled sides 422 and a top side 426, for a total of 5 emitting sides (not including the square base not shown). In another exemplary embodiment, the polarized emitters 202 are positioned beneath the surface of the sides 422, 426, with the electromagnetic radiation from the polarized emitters 202 passing through the surface of the sides 422, 426. Each side 422, 426 includes a linear polarizing sheet having an absorbing axis (represented by the angular position of line 202). The axes are oriented at oblique angles, such that none of the absorbing axes within the pyramid 424 are parallel, or in the same plane (coplanar). Since the detectors 204 are at least laterally separated from each other, and possibly orientationally as well, each will see the emitters 202 differently, and both angular coordinates 102, 104, 106 and spatial coordinates 112, 114, 116 may be extracted. FIG. 4 depicts the exemplary configuration including detectors 204 on (or beneath) a surface 430 of each polarizer 428, with a possible orientation of the uniaxial absorbing axis for that polarizer 428 represented by the angular position of the line. Each axis may be adjusted to optimize performance. Again, this would possibly include placement of elements above or to the sides, not just facing each other as shown in the examples described herein. Two multi-emitter pyramids 424 and two detectors 204 are shown, but as in other embodiments, emitter and detectors locations may be interchanged and unpolarized emitters and detectors may be included. Additionally, each of the two multi-emitter pyramids could be measured and tracked independently from the other, for example, if the distance between them is adjustable such as an adjustable interpupillary distance, or IPD, of a NTE display.

Figure 5:
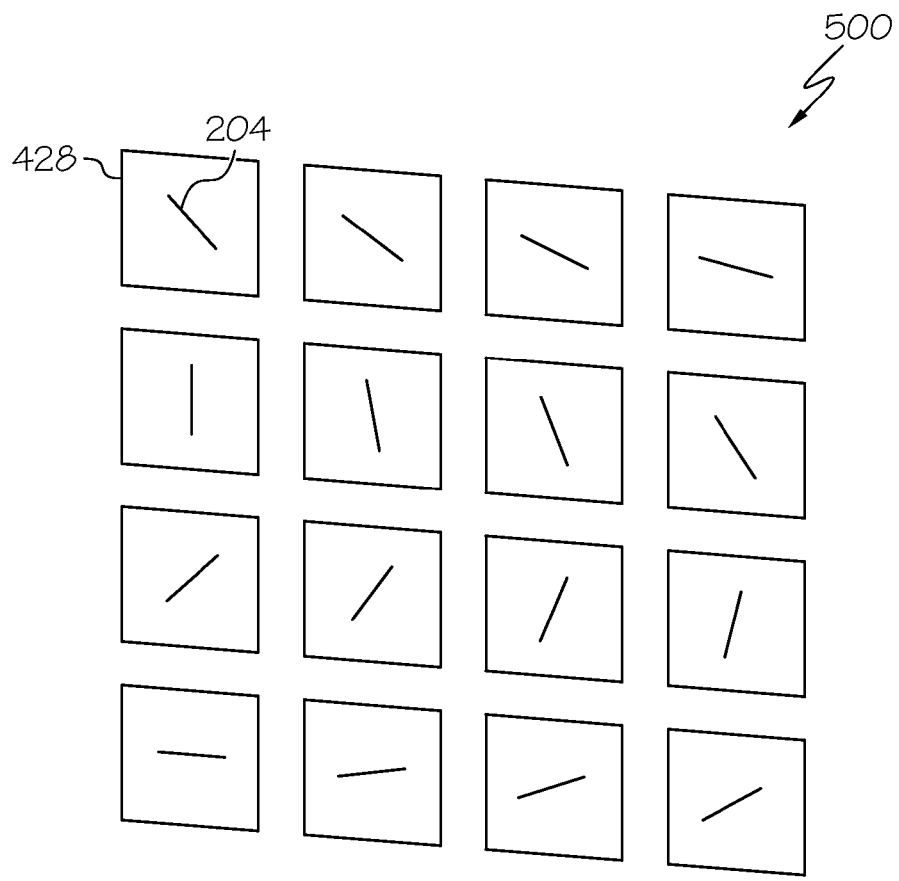
FIG. 5 is an array of detectors for receiving polarized electromagnetic radiation in accordance with yet another exemplary embodiment.

The exemplary embodiment of FIG. 5 includes a compact detector array 500 (e.g., a linear or dual-axis array, or a camera sensor array) rather than single element detectors, where each detector 204 (or subgroup of detectors 204) of the detector array 500 has a different orientation of polarizer 428 (represented by the positioning of the line 204) associated with it. The parameters of the array 500 (e.g., number of detectors 204, size of each detector 204, polarization angles of each polarizer 428, and possible un-polarized detector elements not shown) are subject to optimization. By simultaneously detecting the effective transmittance of arbitrarily polarized emitters 202 through an array of polarizer orientations, an improved estimate of the source polarization can be generated over a larger range of source polarizations. A further variant on FIG. 5 would be a depiction of an exemplary embodiment of a polarized emitter array, wherein array 500 could represent an addressable emissive array or display device with associated output polarizations.

A wide assortment of additional exemplary embodiments are possible, including the examples as follows:

Combination with other tracker types, for redundancy, performance enhancement or cross-checking. Each tracker type will likely have its own associated tradeoffs relating to latency, potential drift, susceptibility to interference or obscuration, etc. In one embodiment, the processor coupled to an additional tracking device could compare and modify the measured spatial coordinates based on the combined outputs of the additional tracking device and the movement tracking system.

Varying the computational algorithm to optimize precision and/or accuracy when head motion is minimal or slow, and to favor low latency in the case of rapid head motion. One of the substantial advantages of the invention as described herein is the potential for extremely low latency tracking, as compared with many known technologies.

Measured results by polarized detectors could be normalized by comparable results from non-polarized detectors, using the ratios to minimize the effects of angular and spatial rolloffs or other dependences.

At the same time, the degree of rolloff could be used as additional input for a calculational or calibrated model, for example to calculate distance between source and detector. Another geometric source of rolloff would be due to projected area factors (e.g. cosine factors due to relative tilts).

Optimization of tradeoffs between range, sensitivity and other parameters. For example, certain head movements are more likely to cover large angular ranges than other head movements.

Utilization of passive or active polarization rotating elements in conjunction with one or more of the sources or detectors. In one example, a switchable LC cell could be placed in one or more of the optical paths. The drive to the LC cell could be adjusted based on the general vicinity of the head-worn unit to enhance sensitivity in that coverage region. If the head moves significantly, the LC cell could be readjusted.

Polarization splitters, such as beam splitter prisms, could be used.

Reduction of noise due to ambient light and other sources by means of averaging algorithms and phase-sensitive detection, for example using pulsed and gated detection techniques with background subtraction. The emitter outputs could additionally be pulse-encoded, with each emitter having a unique pulsing sequence for the purpose of identifying the currently active emitter. If the emitter outputs are identifiable, for example due to pulse-encoding, then they could optionally be driven in a manner which is asynchronous or otherwise independent from the processor 206 of FIG. 2. In addition to being used for identification purposes, the pulse-encoded sequence could also optionally be included in the detection and averaging of the signal levels.

Additional optics, such as lenses, filters or baffles, could be used in conjunction with either emitters or detectors.

Figure 6:
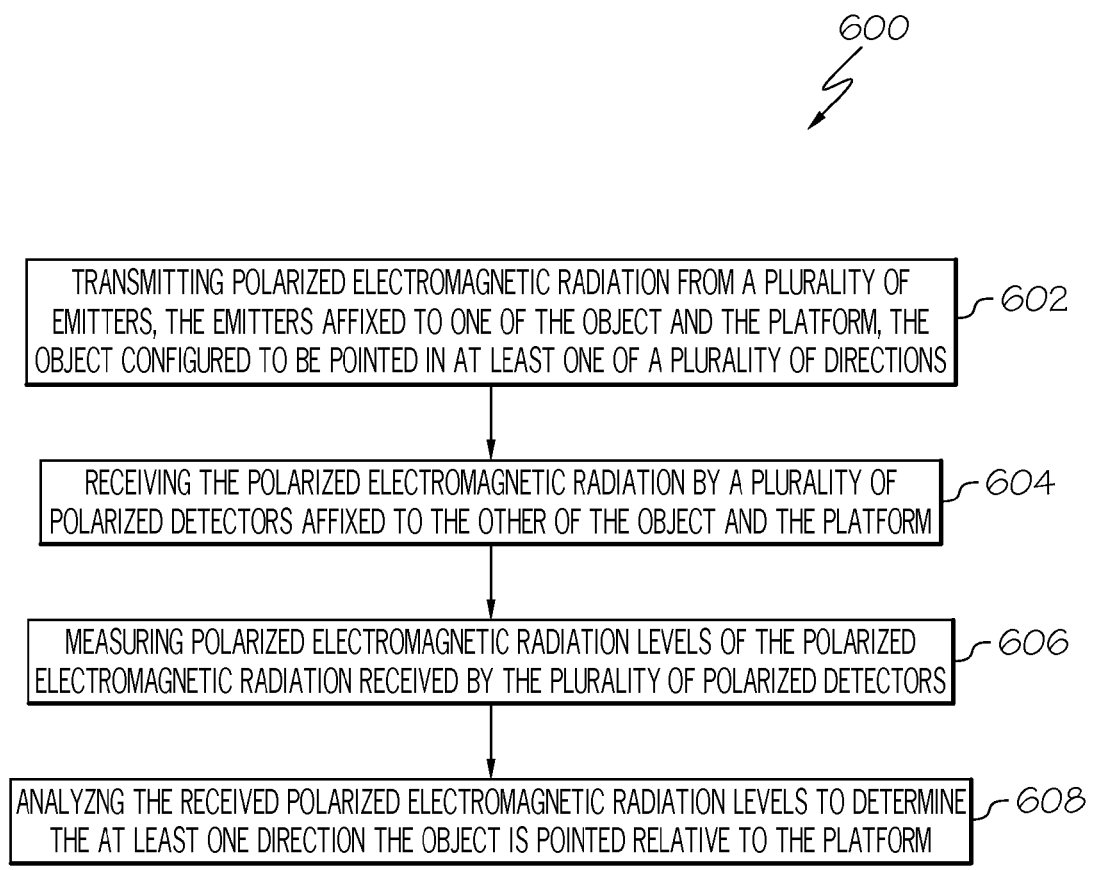
FIG. 6 is a flow diagram of an exemplary method suitable for use with the display system of FIG. 1 in accordance with the exemplary embodiments.

FIG. 6 is a flow chart that illustrates an exemplary embodiment of a method 600 suitable for use with exemplary embodiments described herein. The various tasks performed in connection with method 600 may be performed by software, hardware, firmware, or any combination thereof. For illustrative purposes, the following description of method 600 may refer to elements mentioned above in connection with preceding FIGS. In practice, portions of method 600 may be performed by different elements of the described system, e.g., a processor or a display element. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

In accordance with the exemplary method of FIG. 6, a method 600 for detecting movement comprises transmitting 602 polarized electromagnetic radiation from a plurality of emitters affixed to one of the object and the platform, the object configured to be pointed in at least one of a plurality of directions relative to the platform; receiving 604 the polarized electromagnetic radiation by a plurality of polarized detectors affixed to the other of the object and the platform; measuring 606 polarized electromagnetic radiation levels of the polarized electromagnetic radiation received by the plurality of polarized detectors; and analyzing 608 the received polarized electromagnetic radiation levels to determine the at least one direction the object is pointed. As used herein, analysis means calculational analysis of the measured "polarized electromagnetic radiation levels" or signals.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for tracking an object in relation to a platform, comprising:
    transmitting polarized electromagnetic radiation from a plurality of emitters, the emitters affixed to one of the object and the platform, the object having a plurality of degrees of freedom relative to the platform;
    receiving the polarized electromagnetic radiation by a plurality of polarized detectors affixed to the other of the object and the platform;
    measuring polarized electromagnetic radiation levels of the polarized electromagnetic radiation received by the plurality of polarized detectors; and
    analyzing the received polarized electromagnetic radiation levels to determine a set of angles of the object relative to the platform.

2. The method of claim 1 further comprising positioning the object proximate a person's head.

3. The method of claim 2 further comprising:
    determining information based on the set of angles; and
    displaying the information on a near-to-eye display associated with the object.

4. The method of claim 1 wherein the transmitting further comprises transmitting from emitters affixed to both the object and the platform, and the receiving comprises receiving by detectors affixed to both the object and the platform.

5. The method of claim 1 wherein the transmitting comprises transmitting through a plurality of uniaxial polarizers, wherein axes of the polarizers are not parallel and are not coplanar.

6. The method of claim 1 wherein the analyzing comprises converting the measured polarized electromagnetic radiation levels into at least six degrees of freedom including three angular degrees of freedom and three linear degrees of freedom.

7. The method of claim 1 wherein the analyzing comprises an oversampled numerical fit for averaging out noise.

8. The method of claim 1 wherein analyzing comprises varying a computational algorithm based on detected rate of object motion.

9. The method of claim 1 further comprising normalizing the analyzed polarized electromagnetic radiation levels by comparing results from a non-polarized detector for minimizing the effects of angular and spatial rolloffs.

10. A tracking system, comprising:
    a first object;
    a second object;
    a plurality of emitters affixed to one of the first object and the second object, and configured to transmit polarized electromagnetic radiation;
    a plurality of detectors affixed to the other of the first object and the second object; and
    a processor coupled to the detectors and configured to:
        receive data from the detectors indicative of polarized electromagnetic radiation received by the detectors; and
        analyze the data to determine a set of angles of the first object relative to the second object.

11. The tracking system of claim 10 wherein the movement tracking system further comprises:
    an apparatus affixed to the first object and configured to be positioned on a person's head.

12. The tracking system of claim 11 wherein the processor is further configured to:
    determine information based on the set of angles; and
    display the information on the first object.

13. The tracking system of claim 10 wherein the emitters are affixed to both the first object and the second object.

14. The tracking system of claim 10 wherein the detectors are affixed to both the first object and the second object.

15. The tracking system of claim 10 wherein the emitters are configured to:
    transmit through a plurality of polarizers having a plurality of axis orientations.

16. The tracking system of claim 10 wherein the processor is further configured to:
 convert the measured polarized electromagnetic radiation levels into at least six degrees of freedom including at least three angular and three linear.

17. The tracking system of claim 10 wherein the processor is further configured to determine an oversampled numerical fit for averaging out noise.

18. The tracking system of claim 11 wherein the processor is further configured to:
 vary a computational algorithm to optimize at least one of precision and accuracy when object motion is minimal or slow, and to favor low latency in the case of rapid head motion.

19. The tracking system of claim 10 wherein the processor is further configured to:
 normalize the analyzed polarized electromagnetic radiation levels by comparing results from a non-polarized detector for minimizing the effects of angular and spatial rolloffs.

20. The tracking system of claim 10 wherein the detectors comprise:
 a polarizing structure associated with each of the detectors.

21. The tracking system of claim 10 wherein the emitters comprise:
 a polarizing structure associated with each of the emitters.

22. The tracking system of claim 10 further comprising:
 a plurality of non-polarized detectors affixed to the other of the first object and the second object and configured to receive the polarized electromagnetic radiation; and wherein the processor is further configured to:
 compare results from non-polarized detectors and the detectors, using normalized ratios to minimize the effects of angular and spatial rolloffs.

23. The tracking system of claim 10 wherein the processor is further configured to:
 reduce noise due to ambient electromagnetic radiation by phase-sensitive detection and averaging algorithms.

24. The tracking system of claim 10 wherein the processor is further configured to:
 utilize temporal characteristics of the measured levels.

25. The tracking system of claim 10 further comprising a tracking device coupled to the processor, wherein the processor is further configured to:
 compare an output of the tracking device with the data; and modify the data based on the comparison.

26. The tracking system of claim 10 further comprising:
 a polarization rotating element associated with at least one of the emitters or one of the detectors.

27. The tracking system of claim 10 further comprising:
 pulse-encoding the polarized electromagnetic radiation.

28. A tracking system, comprising:
 a first object;
 a second object;
 a plurality of emitters affixed to one of the first object and the second object;
 a plurality of detectors affixed to the other of the first object and the second object; and
 a processor coupled to the emitters and the detectors and configured to:
  instruct the emitters to transmit polarized electromagnetic radiation;
  receive data from the detectors indicative of polarized electromagnetic radiation received by the detectors; and
  analyze the data to determine a set of angles of the first object relative to the second object.

\* \* \* \* \*